(12) United States Patent
Vanderspek

(10) Patent No.: US 8,938,485 B1
(45) Date of Patent: Jan. 20, 2015

(54) INTEGER DIVISION USING FLOATING-POINT RECIPROCAL

(75) Inventor: Julius Vanderspek, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1460 days.

(21) Appl. No.: 12/030,178

(22) Filed: Feb. 12, 2008

(51) Int. Cl.
G06F 7/52 (2006.01)

(52) U.S. Cl.
USPC .......................................... 708/650; 708/656

(58) Field of Classification Search
USPC ................................................ 708/650, 656
See application file for complete search history.

(56) References Cited

U.S. PATENT DOCUMENTS

| 4,878,190 | A | * | 10/1989 | Darley et al. | 708/605 |
| 5,249,149 | A | * | 9/1993 | Cocanougher et al. | 708/504 |
| 5,737,255 | A | * | 4/1998 | Schwarz | 708/551 |
| 6,598,065 | B1 | * | 7/2003 | Harrison | 708/654 |
| 7,725,519 | B2 | * | 5/2010 | Dockser | 708/497 |
| 2002/0016808 | A1 | * | 2/2002 | Pelton et al. | 708/653 |
| 2004/0117423 | A1 | * | 6/2004 | Shi et al. | 708/650 |
| 2005/0289208 | A1 | * | 12/2005 | Harrison et al. | 708/502 |
| 2005/0289209 | A1 | * | 12/2005 | Robison | 708/650 |
| 2006/0064454 | A1 | * | 3/2006 | Wang et al. | 708/651 |

FOREIGN PATENT DOCUMENTS

| WO | WO 2008/127610 | 10/2008 |
| WO | WO 2008/127622 | 10/2008 |
| WO | WO 2008/127623 | 10/2008 |

OTHER PUBLICATIONS

Eggers, et al., "Simultaneous Multithreading: A Platform for Next-Generation Processors," *IEEE Micro*, vol. 17, No. 5, pp. 12-19, Sep./Oct. 1997.
Oberman, et al. "Design Issues in Division and Other Floating-Point Operations," IEEE Transaction on Computers, vol. 46, No. 2, Feb. 1997, pp. 154-161.
Oberman, Stuart F. "Floating Point Division and Square Root Algorithms and Implementation in the AMD-K7 Microprocessor," Proceedings of the 14th IEEE Symposium on Computer Arithmetic, Apr. 1999, pp. 106-115.
AMD, "Software Optimization Guide for AMD64 Processors", Sep. 2005, available at www.amd.com/us-en/assets/content_type/white_papers_and_tech_docs/25112.PDF.
Alverson, Robert, "Integer Division Using Reciprocals," In Proceedings of the 10th Symposium on Computer Arithmetic, 1991, pp. 186-190.
Robison, Arch D. "N-Bit Unsigned Division Via N-Bit Multiply-Add," 17th IEEE Symposium on Computer Arithmetic, 2005, pp. 131-139.
Moss, et al. "Toward Acceleration of RSA Using 3D Graphics Hardware," LNCS 4887, Dec. 2007, pp. 369-388.

\* cited by examiner

*Primary Examiner* — Li B Zhen
*Assistant Examiner* — Viva Miller
(74) *Attorney, Agent, or Firm* — Patterson & Sheridan, LLP

(57) ABSTRACT

One embodiment of the present invention sets forth a technique for performing fast integer division using commonly available arithmetic operations. The technique may be implemented in a four-stage process using a single-precision floating point reciprocal in conjunction with integer addition and multiplication. Furthermore, the technique may be fully pipelined on many conventional processors for overall performance that is comparable to the best available high-performance alternatives.

22 Claims, 5 Drawing Sheets

INTEGER DIVISION USING FLOATING-POINT RECIPROCAL

BACKGROUND OF THE INVENTION

1. Field of the Invention

Embodiments of the present invention relate generally to computer arithmetic and more specifically to integer division using floating-point reciprocal.

2. Description of the Related Art

A typical computer system uses at least one central processing unit (CPU) to execute programming instructions associated with the specified function of the computer system. The programming instructions include, without limitation, data storage, data retrieval, branching, looping, and arithmetic operations. In order to optimize program execution performance, many conventional CPUs incorporate dedicated hardware resources that can efficiently perform frequently encountered arithmetic operations, such as integer addition (subtraction) and multiplication, which have an important impact on overall performance. Many CPUs also include dedicated hardware resources configured to perform a full set of basic floating-point operations used to improve the performance of a variety of common applications. Integer division, however, is used infrequently enough that most processor designers choose to avoid the added expense of dedicated hardware resources used to perform integer division. In such cases, integer division is typically provided by a performance optimized software implementation.

Certain advanced computer systems augment the processing capability of a general purpose CPU with a specialty processor, such as a graphics processing unit (GPU). Each GPU may incorporate one or more processing units, with higher performance GPUs having 16 or more processing units. GPUs and CPUs are generally designed using similar architectural principles, including a careful allocation of hardware resources to maximize performance while minimizing cost. Furthermore, the arithmetic operations typically selected for execution on dedicated GPU hardware resources tend to mirror the arithmetic operations executed on dedicated CPU hardware resources. Thus, integer division, which is less frequently used in GPU applications, is typically implemented in software for execution on the GPU.

When performing software-based integer division operations, the operations may be performed by software executing integer instructions or a combination of integer and floating-point instructions. For example, the classical shift-and-subtract algorithm using integer machine instructions typically computes no more than one result bit per step, where each step typically includes one to three machine instructions, depending on machine architecture. One solution to improve integer division performance uses one floating-point reciprocal (1/x) function to implement integer division, provided the bit-width of the floating-point mantissa is larger than the bit-width of the integer being processed. However, the standard single-precision floating-point mantissa is only 24-bits, whereas the bit-width of an integer value is typically 32-bits, precluding the use of this approach on most common processors. Another class of solution uses specialty arithmetic operations, such as a floating-point fused-multiply-add (FMA), to facilitate integer division. However, these arithmetic operations are typically not supported by the dedicated hardware resources found on conventional processors, such as commonly available CPUs and GPUs, thereby restricting the usefulness of this class of solution.

As the foregoing illustrates, what is needed in the art is a technique for performing integer division operations in software that uses the hardware resources available on conventional processors more efficiently than prior art approaches.

SUMMARY OF THE INVENTION

One embodiment of the present invention sets forth a method for performing integer division. The method includes the steps of receiving an integer dividend and an integer divisor, computing a floating-point reciprocal based on the divisor, computing a lower bound quotient, generating a reduced error quotient based on the lower bound quotient; and correcting the reduced error quotient to generate a final quotient.

One advantage of the disclosed method is that it enables integer division to be performed on conventional single-precision floating-point hardware more effectively relative to prior art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
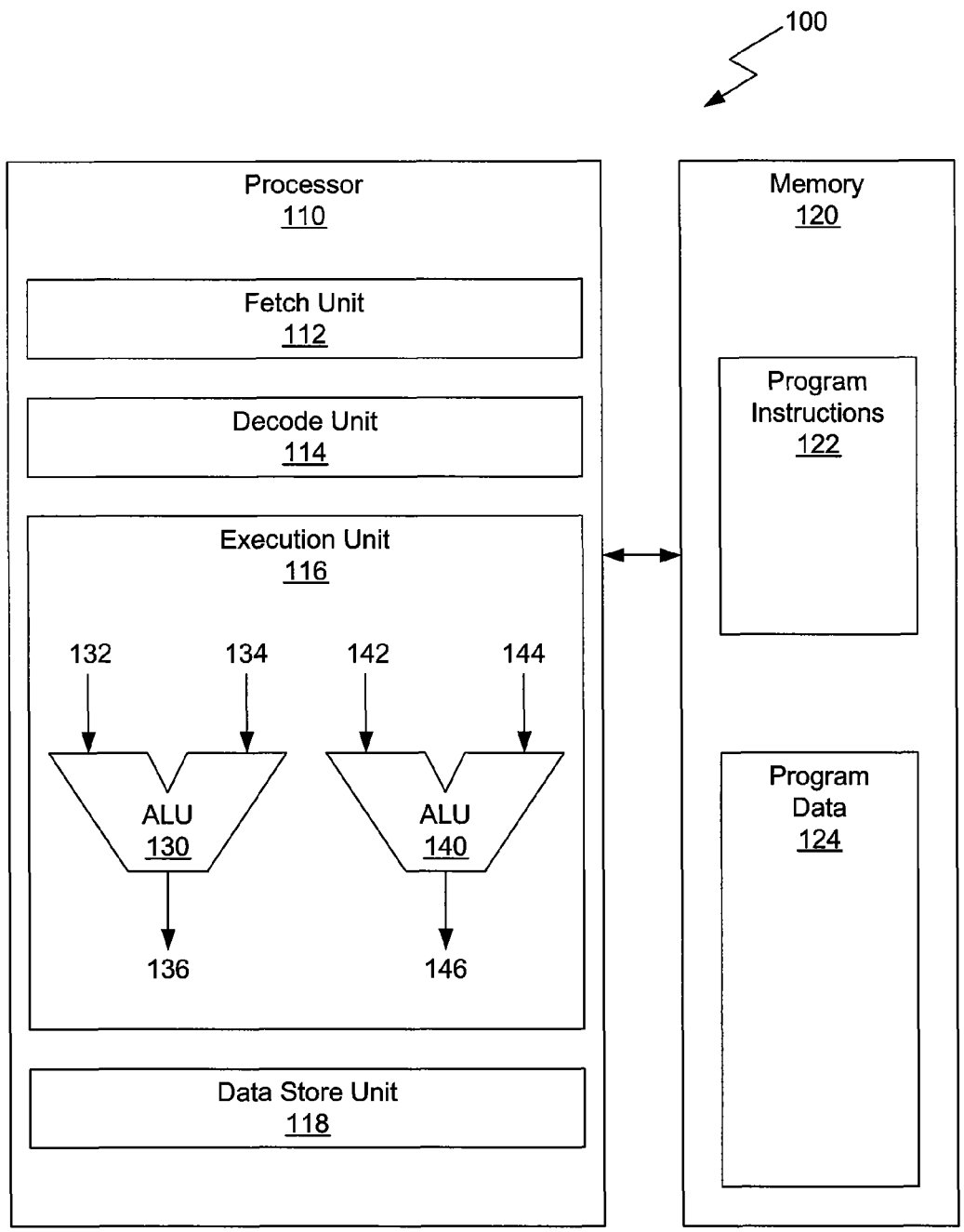
FIG. 1 is a conceptual diagram of a system in which one or more aspects of the invention may be implemented.

FIG. 1 is a conceptual diagram of a system 100 in which one or more aspects of the invention may be implemented. The system 100 includes a processor 110, which may be any type of conventional CPU, GPU or similar processing device, coupled to a memory 120. The processor 110 includes a fetch unit 112, a decode unit 114, an execution unit 116 and a data store unit 118. The memory 120 stores information related to the operation of the processor 110, including, without limitation, program instructions 122 and program data 124.

The fetch unit 112 retrieves a sequential instruction stream for processing from the program instructions 122 stored in memory 120. Certain operations within the instruction stream require additional data, which may be retrieved by the fetch unit 112 from the program data 124 within the memory 120. The decode unit 114 directs specific actions that should be performed by the logic within the processor 110 in order to execute a decoded instruction. For example, the decode unit 114 may configure the execution unit 116 to perform an integer multiply upon decoding an integer multiply instruction from the instruction stream.

The execution unit 116 performs the operations associated with decoded instructions using dedicated hardware resources, including, without limitation, at least one arithmetic-logic unit (ALU). Conventional processors typically incorporate independent ALUs for processing related types of data. For example, execution unit 116 within processor 110 includes ALU 130 for processing integer operations and ALU 140 for processing floating-point operations. When the execution unit 116 performs an integer multiply, a multiplicand and a multiplier are presented to inputs 132 and 134 of ALU 130. The resulting product is emitted from output 136 of ALU 130 for further processing. Similarly, when the execution unit 116 performs a floating-point division, a dividend and divisor are presented to inputs 142 and 144 of ALU 140. The ALU 140 computes a quotient, and emits the quotient via output 146.

The output 136 of ALU 130 and the output 146 of ALU 140 may be stored within the processor 110 or stored in the program data 124. The data store unit 118 performs the necessary actions to store ALU outputs 130 and 140 in the program data 124 within memory 120 for later use.

Figure 2:
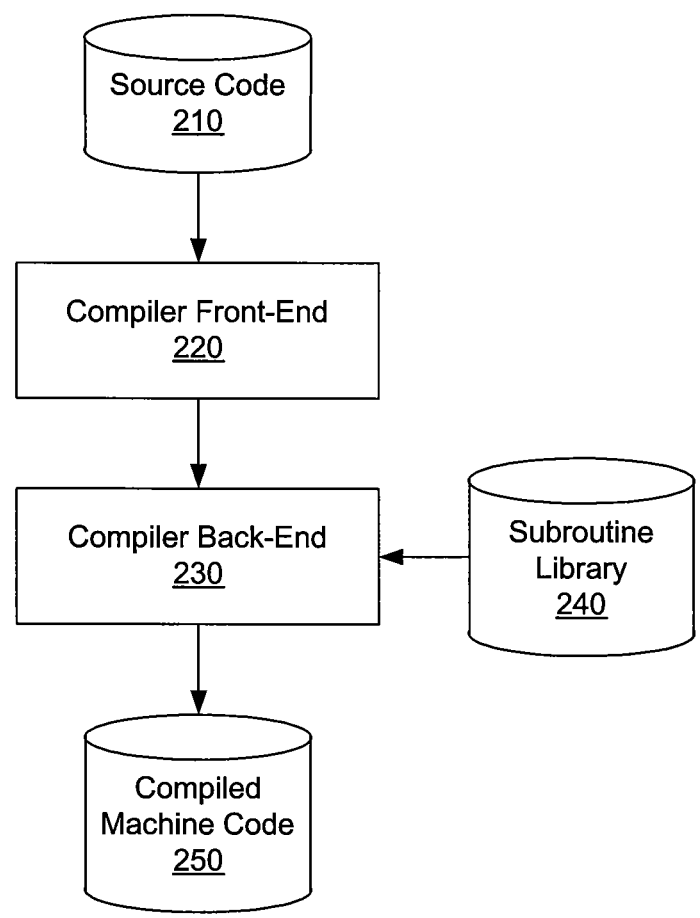
FIG. 2 is a conceptual illustration of source code to machine code compilation, according to one embodiment of the invention.

FIG. 2 is a conceptual illustration of source code 210 to machine code 250 compilation, according to one embodiment of the invention. As shown, source code 210, which may be written in a high-level language such as "C," is processed by a compiler front-end 220. The compiler front-end 220 translates the source code 210 into an intermediate code representation of the source code 210. The intermediate code represents the translated operations of source code 210 in terms of generic operations that tend to be independent of the specific instruction set of the target processor. In fact, the intermediate code may invoke operations that are not directly supported by the target processor. For example, if source code 210 specifies an integer division operation in the flow of programming instructions, then that same division operation may be reproduced as an integer division operation in the more generic operations of the intermediate code. While integer division operations may be supported by some processors, these operations may not be supported by many conventional processors. For processors that do not directly support integer division, these operations may instead be implemented within a subroutine library 240 and called or instantiated within compiled machine code 250.

A compiler back-end 230 receives the intermediate code and generates machine code that is specific to the target processor. In some embodiments, code from the subroutine library 240 is incorporated into the compiled machine code 250 by the compiler back-end 230. The functions within the subroutine library 240 may then be invoked as needed with a function call. Alternately, selected functions within the subroutine library 240 maybe included "in-line" in the compiled machine code 250, thereby eliminating the overhead of a function call, but increasing the size of the resulting compiled machine code 250.

The compiled machine code 250 may be stored in the memory 120 of FIG. 1 as all or part of the program instructions 122. As described below in FIG. 3, the compiled machine code 250 included in the program instructions 122 may be used by the processor 110 to perform integer division operations where the processor 110 does not include hardware elements dedicated for such operations.

Figure 3:
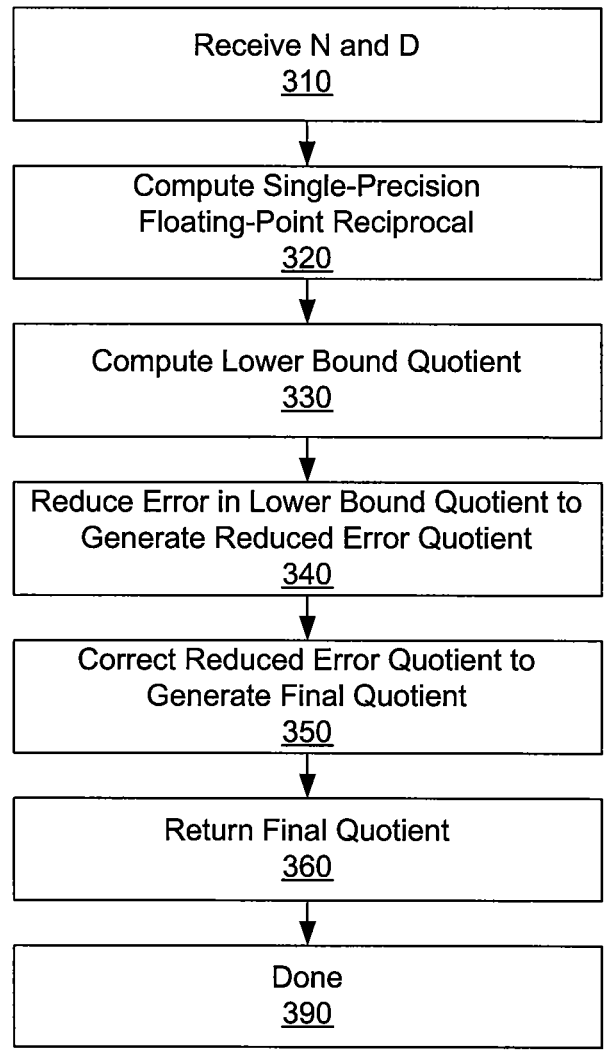
FIG. 3 is a flow diagram of method steps for computing an unsigned integer division using a floating-point reciprocal operation, according to one embodiment of the invention.

FIG. 3 is a flow diagram of method steps for computing an unsigned integer division using a floating-point reciprocal operation, according to one embodiment of the invention. Although the method steps are described in conjunction with the systems of FIGS. 1, 2, 4 and 5, persons skilled in the art will understand that any system configured to perform the method steps, in any order, is within the scope of the invention. Furthermore, techniques for performing operations related to unsigned division, such as signed division and integer modulo, may be implemented using the method taught herein in conjunction with wrapper techniques that are well-known in the art.

The method begins in step 310, where the processor 110 receives two integer values, "N" and "D" for processing. These two integer values may be read from internal storage, such as a register file or the program data 124 stored in memory 120. The variable N contains the value of a dividend (numerator), and the variable D contains the value of a divisor (denominator), of a division operation. Variables N and D are both represented in an integer format.

In step 320, the processor 110 computes a single-precision floating-point reciprocal using the divisor (D) as input to the reciprocal calculation. The reciprocal calculation is performed using a round to nearest rounding policy. The process of computing the single-precision floating-point reciprocal is illustrated in the pseudo-code shown below in TABLE 1. Again, N is dividend and D is the divisor. A function call to fesetround (FE_TONEAREST) instructs the floating-point unit within processor 110 to round any results to the nearest least significant bit represented in the floating-point format. In alternative embodiments, any technically feasible mechanism may be used to establish each specified floating-point rounding policy. Each variable, including "fD," "f_D," and "f_Dlowered" are declared as floating-point, indicated by the preceding "float" declaration. In the second line of pseudo-code in Table1, floating-point variable fD is assigned to the value of input integer D. In the third line of pseudo-code in Table1, floating-point variable f_D is declared and assigned to the floating-point reciprocal of fD. Finally, f_Dlowered is computed by passing f_D through function Lower( ). The resulting lowered reciprocal is stored in f_Dlowered. In alternative embodiments, f_Dlowered may be computed directly (without calling the Lower ( ) function), in a processor 110 that includes a "round-up" rounding policy for the floating-point reciprocal operation shown in Table 1.

TABLE 1 fesetround (FE_TONEAREST);
float fD = D;
float f_D = 1.0/fD;
float f_Dlowered = Lower (f_D);

The Lower ( ) function shown in Table 1 receives an input floating-point value in the range 2^(−32) through 2^32 and returns a value that is lowered by up to two least significant bits of the mantissa of the original value. That is, when "f" is a 32-bit IEEE standard floating-point number, the function Lower (f) has a behavior bounded by Equation 1, below.

$$f - (2\wedge -22 * f) <= Lower(f) <= f - (2\wedge -23 * f) \qquad \text{Equation 1}$$

One implementation of the Lower( ) function is illustrated in the pseudo-code shown below in TABLE 2. A floating-point variable "fpvalue" contains a floating-point value for the Lower( ) function to process. A pointer to an unsigned 32-bit integer is defined as integer pointer "ip." References to the contents of a memory location pointed to by "ip" are indicated as "*ip." Arithmetic operations on "*ip" are performed as though the contents of the referenced memory location are unsigned 32-bit integer values. In the first line of pseudo-code, integer pointer "ip" is declared and assigned to point to the location in memory where floating-point variable fpvalue resides. In effect, the raw bits representing fpvalue are made available for processing as an unsigned 32-bit integer. In the second line of pseudo-code, the raw bits representing fpvalue are treated as an integer value for the purpose of subtracting "2" from contents of the memory location storing fpvalue. In effect, a value of 2 is subtracted from the raw machine code representation of the fpvalue, treated as an integer. The subtract operation is performed on a concatenation of a biased exponent field situated in the most significant bits representing fpvalue, and a mantissa field, situated in the least significant bits representing fpvalue. Therefore, a mantissa underflow will borrow from the exponent field and yield a correct arithmetic result. Because the input values are bounded by the range of $2^{-32}$ to $2^{32}$, bounds checking on the biased exponent field should be unnecessary for standard 32-bit IEEE floating-point values.

TABLE 2

```
uint32 *ip = (uint32*) &fpvalue;
*ip -= 2;
```

In step 330, the processor 110 computes a lower bound quotient. The process of computing the lower bound quotient is illustrated in the pseudo-code shown below in TABLE 3. The lower bound quotient calculation is performed using a round toward zero policy. A function call to fesetround (FE_TOWARDZERO) instructs the floating-point unit within processor 110 to round the least significant bit, represented in the floating-point result, towards zero. In the second line of pseudo-code in Table3, floating-point variable fErr1 is declared and assigned the value of integer variable N. In the third line of pseudo-code, a floating-point lower bound quotient is computed, using the lowered reciprocal, f_Dlowered, computed in Table 1. Finally, the an unsigned 32-bit integer lower bound quotient is assigned to unsigned 32-bit integer "Q1."

TABLE 3

```
fesetround (FE_TOWARDZERO);
float fErr1      = N;
float fQ1        = fErr1 * f_Dlowered;
uint32 Q1        = fQ1;
```

In step 340, the processor 110 generates a reduced error quotient by performing computations to reduce the error associated with the lower bound quotient computed in step 330. The process of computing the reduced error quotient is illustrated in the pseudo-code shown below in TABLE 4.

The function call to fesetround (FE_TOWARDZERO) performed previously in step 330 continues in force throughout step 340. Therefore, each floating-point operation in step 340 is performed using a round toward zero policy.

In the second line of pseudo-code of Table 4, variable "N2" is declared and assigned to the integer product of integer values stored in Q1 and D. Variable "err2" is then declared and assigned to the difference between N and N2. Floating-point variable "fErr2" is then declared and assigned the value of unsigned 32-bit integer variable "err2." Floating-point variable "fQ2" is then declared and assigned to the floating-point product of previously computed values stored in fErr2 and f_Dlowered. An unsigned 32-bit integer variable "Q2" is declared and assigned the value stored in floating-point variable fQ2. Finally, an unsigned 32-bit integer variable "result2" is assigned to the sum of Q2 and the previously value of Q1. In effect, the value of Q2 adjusts the initially computed lower bound quotient Q1 up a small amount to reduce the overall error bound to be less than or equal to one. The resulting value corresponds to a reduced error quotient, stored in variable result2.

TABLE 4

```
// in round to zero mode
uint32 N2 = Q1 * D;
uint32 err2 = N - N2;
float fErr2 = err2;
float fQ2 = fErr2 * f_Dlowered;
uint32 Q2 = fQ2;
uint32 result2 = Q2 + Q1;
```

In step 350, the processor 110 generates a final quotient by correcting the reduced error quotient computed in step 340. The process of computing the final quotient is illustrated in the pseudo-code shown below in TABLE 5.

An unsigned 32-bit variable "N3" is declared and assigned the product of result2 by D. An unsigned 32-bit variable "err3" is declared and assigned the difference of N minus N3. If err3 is larger than or equal to D (the input denominator), then variable oneCorr (one correction) is set to "1," otherwise oneCorr is set to "0." The final quotient is stored in variable Qfinal, which is declared and assigned the sum of result2 (reduced error quotient) and oneCorr in line four of Table 5.

TABLE 5

```
uint32 N3 = result2 * D;
uint32 err3 = N - N3;
uint32 oneCorr = err3 >= D;
uint32 Qfinal = result2 + oneCorr;
```

In step 360, the final quotient (Qfinal), computed in step 350, is returned. In one embodiment, the final quotient is returned to a calling function. In an alternate embodiment, the final quotient is computed using in-line code, and the process of returning the final quotient may not require an explicit return operation. The, method terminates in step 390.

The pseudo-code in Tables 1 through 5 uses a specific style whereby variables are declared and assigned on the same line. However, variable declaration may be performed using any technically appropriate technique without deviating from the scope of the present invention.

The method of FIG. 3 advantageously allows integer division to be performed effectively on conventional single-precision floating-point hardware. More specifically, as is well-known, applications that use floating-point arithmetic tend to rely on a mix of operations, including addition (subtraction), multiplication and division in order to achieve good overall performance. In fact, the availability of high-performance floating-point division tends to be an important requirement to the overall performance of many floating-point applications. The bit-width of each floating-point variable in many conventional 32-bit CPU architectures (and GPUs with internal 32-bit architectures) is limited to standard "single-precision" 32-bit values, as specified in the IEEE 754 specification. A standard 32-bit single-precision floating-point number includes twenty-four bits of mantissa (twenty-three bits are represented, with a leading implied "1" value), eight bits of exponent and a sign bit. Thus, persons skilled in the art will readily recognize the compatibility of the disclosed algorithm with such conventional hardware designs.

Persons skilled in the art will also recognize that the disclosed integer division technique may be realized in many different implementations on many different processing platforms without deviating from the scope of the present invention. For example, the integer division technique may be implemented on a graphics processing unit (GPU) configured to execute multiple threads in multiple streaming multiprocessor cores, as discussed in greater detail below.

Figure 4:
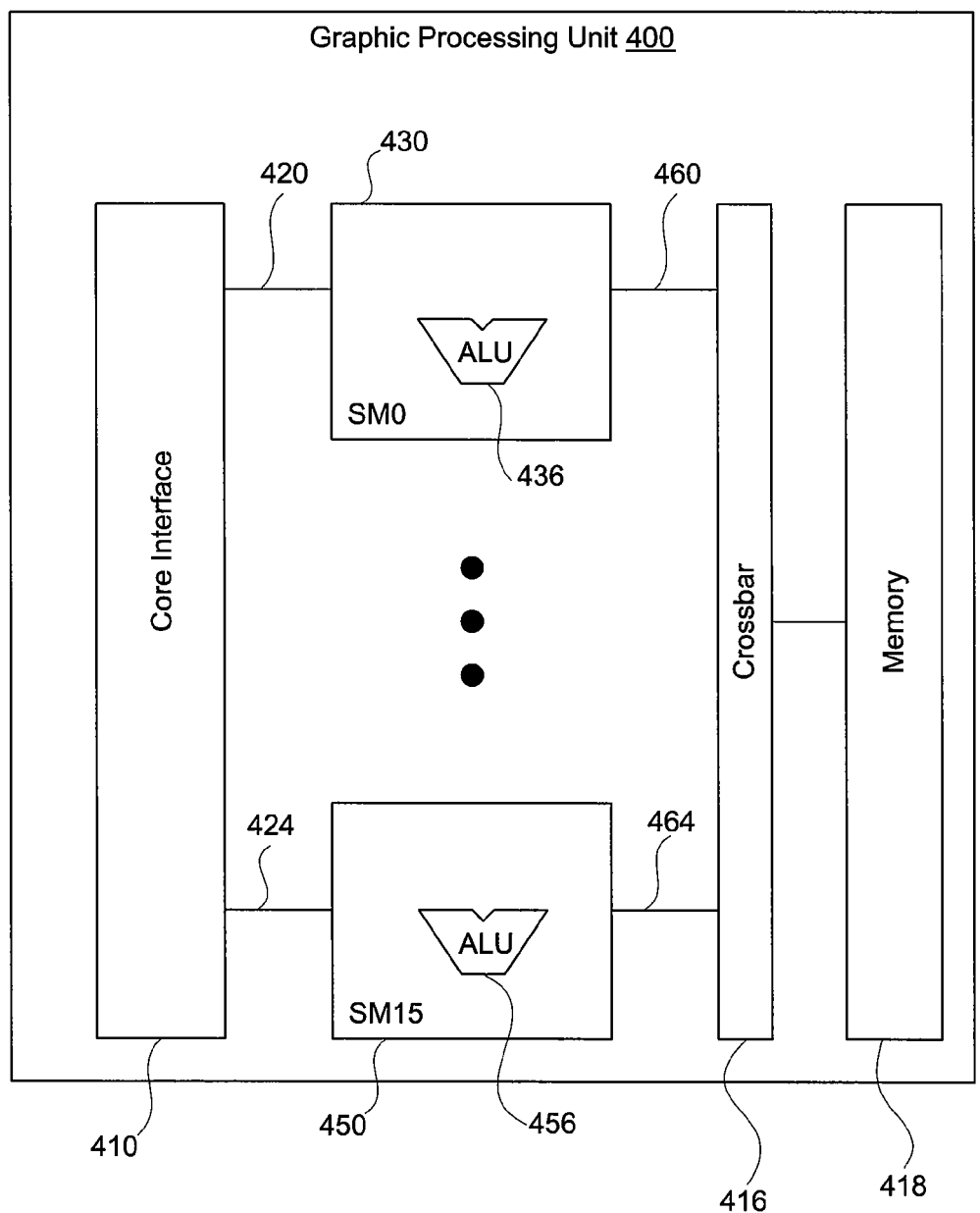
FIG. 4 is a conceptual diagram of a graphics processing unit in which one or more aspects of the invention may be implemented.

FIG. 4 is a conceptual diagram of a graphics processing unit (GPU) 400 in which one or more aspects of the invention may be implemented. As shown, the GPU 400 includes a memory 418 and a plurality of streaming multiprocessors, shown as "SM0" 430 and "SM15" 450. Each streaming multiprocessor is a single-instruction, multiple-data ("SIMD") multiprocessor that may execute instructions independently of the other streaming multiprocessors within the GPU 400. In addition, each streaming multiprocessor executes a single instruction on different data across a plurality of streaming processors (not shown) included within that streaming multiprocessor. The series of instructions to a single streaming processor within a streaming multiprocessor is referred to as a "thread," and the collection of concurrently executing threads among the streaming processors within the streaming multiprocessor is referred to as a "thread group."

The instructions executed by a streaming multiprocessor may be an arithmetic, logical and/or memory operation, including read and write operations to the memory 418. Arithmetic and logic operations are performed by ALUs 436 and 546. Each ALU 436, 546 includes logic to perform integer operations and floating-point operations, including, without limitation, integer addition and multiplication, as well as floating-point division. The threads executing on a particular streaming multiprocessor may be configured to execute the method steps of FIG. 3 in order to perform integer division with greater efficiency.

The GPU 400 also includes a core interface 410 that couples the GPU 400 to external memory resources. The core interface 410 is also coupled to the streaming multiprocessors 430 and 450 through a plurality of couplings, shown as interfaces 420 and 424, respectively. The streaming multiprocessors 430 and 450 are coupled to the memory 418 through a crossbar 416, which is advantageously designed to allow any streaming multiprocessor to access any memory location within the memory 418. The streaming multiprocessors 430, 440 and 450 access the memory 418 through couplings 460 and 464, respectively, and through a coupling between the crossbar 416 and the memory 418 (not shown). The couplings 460 and 464 may allow wide data transfers (e.g., 256 bits or more) between the memory 418 and the streaming multiprocessors of the GPU 400.

Figure 5:
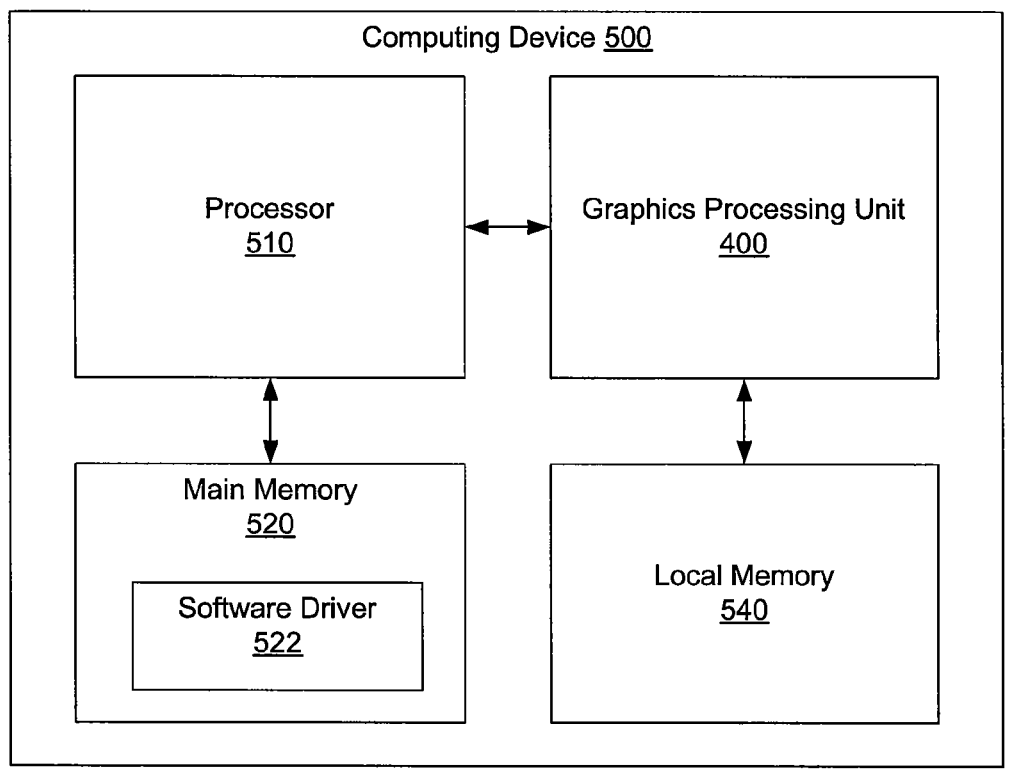
FIG. 5 is a conceptual diagram of a computing device that includes the graphics processing unit of FIG. 4 and is configured to implement one or more aspects of the invention.

FIG. 5 is a conceptual diagram of the computing device 500 that includes the graphics processing unit 400 of FIG. 4 and is configured to implement one or more aspects of the invention. As shown, the computing device 500 includes a processor 510, a main memory 520, a graphics processing unit 400 of FIG. 4 and a local memory 540. The main memory 520 includes a software driver program 522, used to configure and manage the graphics processing unit 400. The main memory 520 is coupled to the processor 510. The local memory 540 is coupled to the graphics processing unit 400, providing a high-bandwidth memory resource. In some embodiments, the main memory 520 may be accessed by the graphics processing unit 400 via the processor 510. In further embodiments, the local memory 540 may be accessed by the processor 510 via the graphics processing unit 400. In various embodiments, either the graphics processing unit 400 or the processor 510, or both, may be configured to implement the integer division algorithm described in conjunction with the method of FIG. 3. The computing device 500 may be a desktop computer, server, laptop computer, palm-sized computer, personal digital assistant, tablet computer, game console, cellular telephone, or any other type of similar device that processes information.

In sum, a high-performance technique for computing integer division using commonly available instructions, such as a floating-point reciprocal, is disclosed. The technique computes one floating-point reciprocal. The reciprocal value is then used to compute a lower bound quotient, which is guaranteed to be less than or equal to the mathematically true quotient. The lower bound quotient is used to compute a reduced error quotient, which is guaranteed to be less than or equal to the mathematically true quotient by either zero or one. The reduced error quotient is then corrected to generate a final quotient, which is equal to a mathematically true quotient. The technique may be fully pipelined by using predicated execution instructions (where computation decisions are required), for higher performance.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A computer implemented method for performing integer division operations on a central processing unit (CPU), the method comprising:
  receiving an integer dividend and an integer divisor;
  computing a floating-point reciprocal based on the divisor;
  computing a lowered floating-point reciprocal based on the floating-point reciprocal, wherein the lowered floating-point reciprocal is lower than the floating-point reciprocal by up to two least significant bits of the mantissa of the floating-point reciprocal;
  computing, via an execution unit within the CPU, a lower bound quotient based on a product of the lowered floating-point reciprocal and a floating point variable assigned a value of the integer dividend, wherein the product is designated as an unsigned integer;
  generating a reduced error quotient based on the lower bound quotient; and
  correcting the reduced error quotient to generate a final quotient,
  wherein the CPU does not include any circuitry specifically configured to perform integer division operations.

2. The computer implemented method of claim 1, wherein the lower bound quotient is computed using a round toward zero policy that rounds the least significant bit towards zero.

3. The computer implemented method of claim 1, wherein the floating-point reciprocal is computed using a nearest rounding policy that rounds any results to the nearest least significant bit represented in an applicable floating-point format.

4. The computer implemented method of claim 3, wherein the floating-point reciprocal has single-precision.

5. The computer implemented method of claim 1, wherein the reduced error quotient is generated by performing computations to reduce the error associated with the lower bound quotient.

6. The computer implemented method of claim 5, further comprising returning the final quotient to a calling function.

7. A non-transitory computer-readable medium including instructions that, when executed by a processing unit, cause the processing unit to perform integer division operations, by performing the steps of:
   receiving an integer dividend and an integer divisor;
   computing a floating-point reciprocal based on the divisor;
   computing, via an execution unit within the processing unit, a lowered floating-point reciprocal based on the floating-point reciprocal, wherein the lowered floating-point reciprocal is lower than the floating-point reciprocal by up to two least significant bits of the mantissa of the floating-point reciprocal;
   computing a lower bound quotient based on a product of the lowered floating-point reciprocal and a floating point variable assigned a value of the integer dividend, wherein the product is designated as an unsigned integer;
   generating a reduced error quotient based on the lower bound quotient; and
   correcting the reduced error quotient to generate a final quotient,
   wherein the processing unit does not include any circuitry specifically configured to perform integer division operations.

8. The computer-readable medium of claim 7, wherein the lower bound quotient is computed using a round toward zero policy that rounds the least significant bit towards zero.

9. The computer-readable medium of claim 7, wherein the floating-point reciprocal is computed using a nearest rounding policy that rounds any results to the nearest least significant bit represented in an applicable floating-point format.

10. The computer-readable medium of claim 9, wherein the floating-point reciprocal has single-precision.

11. The computer-readable medium of claim 7, wherein the reduced error quotient is generated by performing computations to reduce the error associated with the lower bound quotient.

12. The computer-readable medium of claim 11, further comprising the step of returning the final quotient to a calling function.

13. A computing device configured perform integer division operations, the computing device comprising:
   a memory configured to store program instructions and program data; and
   a central processing unit (CPU) configured to execute the program instructions and perform the steps of:
   receiving an integer dividend and an integer divisor;
   computing a floating-point reciprocal based on the divisor;
   computing a lowered floating-point reciprocal based on the floating-point reciprocal, wherein the lowered floating-point reciprocal is lower than the floating-point reciprocal by up to two least significant bits of the mantissa of the floating-point reciprocal;
   computing, via an execution unit within the CPU, a lower bound quotient based on a product of the lowered floating-point reciprocal and a floating point variable assigned a value of the integer dividend, wherein the product is designated as an unsigned integer;
   generating a reduced error quotient based on the lower bound quotient; and
   correcting the reduced error quotient to generate a final quotient,
   wherein the CPU does not include any circuitry specifically configured to perform integer division operations.

14. The method of claim 1, wherein the lowered floating-point reciprocal is computed using a lower function, and, in implementing the lower function, a raw machine code representation of the floating-point reciprocal is treated as an integer value, and a value of two is subtracted from the integer value.

15. The method of claim 14, wherein the floating-point reciprocal, f, comprises a thirty-two bit standard floating-point number, and the lower function, Lower(f), has a behavior bounded by $f-(2^\wedge-22*f)<=Lower(f)<=f-(2^\wedge-23*f)$.

16. The method of claim 1, wherein the CPU implements a round-up rounding policy for the floating-point reciprocal computation, and the lowered floating-point reciprocal is computed directly.

17. The computer-readable medium of claim 7, wherein the lowered floating-point reciprocal is computed using a lower function, and, in implementing the lower function, a raw machine code representation of the floating-point reciprocal is treated as an integer value, and a value of two is subtracted from the integer value.

18. The computer-readable medium of claim 17, wherein the floating-point reciprocal, f, comprises a thirty-two bit standard floating-point number, and the lower function, Lower(f), has a behavior bounded by $f-(2^\wedge-22*f)<=Lower(f)<=f-(2^\wedge-23*f)$.

19. The computer-readable medium of claim 7, wherein the CPU implements a round-up rounding policy for the floating-point reciprocal computation, and the lowered floating-point reciprocal is computed directly.

20. The computing device of claim 13, wherein the lowered floating-point reciprocal is computed using a lower function, and, in implementing the lower function, a raw machine code representation of the floating-point reciprocal is treated as an integer value, and a value of two is subtracted from the integer value.

21. The computing device of claim 20, wherein the floating-point reciprocal, f, comprises a thirty-two bit standard floating-point number, and the lower function, Lower(f), has a behavior bounded by $f-(2^\wedge-22*f)<=Lower(f)<=f-(2^\wedge-23*f)$.

22. The computing device of claim 13, wherein the CPU implements a round-up rounding policy for the floating-point reciprocal computation, and the lowered floating-point reciprocal is computed directly.

* * * * *